US006635370B2

(12) United States Patent
Condit et al.

(10) Patent No.: US 6,635,370 B2
(45) Date of Patent: Oct. 21, 2003

(54) SHUT-DOWN PROCEDURE FOR HYDROGEN-AIR FUEL CELL SYSTEM

(75) Inventors: David A. Condit, Avon, CT (US); Richard D. Breault, North Kingstown, RI (US)

(73) Assignee: UTC Fuel Cells, LLC, South Windsor, CT (US)

( * ) Notice: Subject to any disclaimer, the term of this patent is extended or adjusted under 35 U.S.C. 154(b) by 350 days.

(21) Appl. No.: 09/872,957

(22) Filed: Jun. 1, 2001

(65) Prior Publication Data

US 2002/0182456 A1 Dec. 5, 2002

(51) Int. Cl.[7] .................................................. H01M 8/00
(52) U.S. Cl. ........................................... 429/13; 429/17
(58) Field of Search ...................................... 429/13, 17

(56) References Cited

U.S. PATENT DOCUMENTS

| | | | | |
|---|---|---|---|---|
| 5,170,124 A | | 12/1992 | Blair et al. ................. 324/434 |
| 5,529,683 A | * | 6/1996 | Critz et al. ................. 205/350 |
| 5,648,182 A | * | 7/1997 | Hara et al. .................... 429/20 |
| 5,991,670 A | | 11/1999 | Mufford et al. .............. 701/22 |
| 6,127,057 A | * | 10/2000 | Gorman ....................... 429/25 |
| 6,242,120 B1 | * | 6/2001 | Herron ........................ 429/22 |
| 6,309,768 B1 | * | 10/2001 | Patterson et al. ............. 429/13 |
| 6,376,112 B1 | * | 4/2002 | Clingerman et al. .......... 429/17 |
| 6,395,414 B1 | * | 5/2002 | Clingerman et al. .......... 429/17 |
| 6,413,662 B1 | * | 7/2002 | Clingerman et al. .......... 429/25 |
| 6,461,751 B1 | | 10/2002 | Boehm et al. ................ 429/13 |
| 6,514,635 B2 | * | 2/2003 | Van Dine et al. ............. 429/17 |
| 6,562,496 B2 | * | 5/2003 | Faville et al. ................. 429/13 |

* cited by examiner

*Primary Examiner*—Bruce F. Bell

(57) ABSTRACT

A fuel cell system is shut down by disconnecting the primary load, shutting off the air flow, and controlling the fuel flow into the system (including shutting off the fuel flow) and the gas flow out of the system in a manner that results in the fuel cell gases coming to equilibrium across the cells at a gas composition of at least 0.0001% hydrogen (by volume), and preferably between 1.0% and less than 4.0% hydrogen, by volume, with a balance of nitrogen and possibly other gases inert and harmless to the fuel cell, all the oxygen having been consumed by reacting with the hydrogen within the cell. That gas composition is maintained within the cells throughout shut-down, such as by adding hydrogen to replace any that is consumed by reaction with air leaking into the cells during the period of shut-down. This shut-down procedure causes virtually no cell performance losses.

30 Claims, 4 Drawing Sheets

SHUT-DOWN PROCEDURE FOR HYDROGEN-AIR FUEL CELL SYSTEM

BACKGROUND OF THE INVENTION

1. Technical Field

This invention relates to fuel cell systems and, more particularly, to procedures for shutting down an operating fuel cell system.

2. Background Information

In fuel cell systems of the prior art, it is well known that, when the electrical circuit is opened and there is no longer a load across the cell, such as upon and during shut-down of the cell, the presence of air on the cathode, coupled with hydrogen fuel remaining on the anode, often cause unacceptable anode and cathode potentials, resulting in catalyst and catalyst support oxidation and corrosion and attendant cell performance degradation. It was thought that inert gas needed to be used to purge both the anode flow field and the cathode flow field immediately upon cell shut-down to passivate the anode and cathode so as to minimize or prevent such cell performance degradation. Further, the use of an inert gas purge avoided, on start-up, the possibility of the presence of a flammable mixture of hydrogen and air, which is a safety issue. While the use of 100% inert gas as the purge gas is most common in the prior art, commonly owned U.S. Pat. Nos. 5,013,617 and 5,045,414 describe using 100% nitrogen as the anode side purge gas, and a cathode side purging mixture comprising a very small percentage of oxygen (e.g. less than 1%) with a balance of nitrogen. Both of these patents also discuss the option of connecting a dummy electrical load across the cell during the start of purge to lower the cathode potential rapidly to between the acceptable limits of 0.3–0.7 volt.

It is desired to avoid the costs associated with storing and delivering a separate supply of inert gas to fuel cells, especially in automotive applications where compactness and low cost are critical, and where the system must be shut-down and started frequently. Therefore, safe, cost effective shut-down procedures are needed that do not cause significant performance degradation and do not require the use of a separate supply of inert gases at shut-down, during shut-down, or upon restarting the fuel cell system.

BRIEF SUMMARY OF THE INVENTION

In accordance with the present invention, a fuel cell system is shut down by disconnecting the primary electricity using device (hereinafter, "primary load"), shutting off the air flow, and controlling the fuel flow into the system and the gas flow out of the system in a manner that results in the fuel cell gases coming to equilibrium across the cells, with the fuel flow shut off, at a gas composition (on a dry basis, e.g. excluding water vapor) of at least 0.0001% hydrogen, balance fuel cell inert gas, and maintaining a gas composition of at least 0.0001% hydrogen (by volume), balance fuel cell inert gas, during shut-down. Preferably, any nitrogen within the equilibrium gas composition is from air either introduced into the system directly or mixed with the fuel.

"As used herein, "fuel cell inert gases" means gases that do not react wit hydrogen or oxygen or within the fuel cell, and do not otherwise harm cell performance to any significant extent, a d are, therefore, harmless to the fuel cell. Fuel cell inert gases may also include trace amounts of elements found in atmospheric air. If the fuel is pure hydrogen and the oxidant is air, the "balance" fuel cell inert gas will be substantially all nitrogen, with a small amount of carbon dioxide found in atmospheric air, plus trace amounts of other elements found in atmospheric air. For purposes of this specification, carbon dioxide is considered a fuel cell inert gas since it does not react with hydrogen, oxygen, and is not otherwise harmful to the fuel cell to any significant extent.

If the fuel is a reformed hydrocarbon, the fuel entering the cell includes hydrogen, carbon dioxide, and carbon monoxide. The hydrogen concentration can vary from 30 to 80 volume percent hydrogen depending on the type of fuel processing system used in the power plant. In that case, air (i.e. essentially oxygen and nitrogen) is sometimes injected into the fuel upstream of the anode flow field to oxidize the carbon monoxide. The carbon monoxide is not a fuel cell inert gas, and needs to be completely converted to carbon dioxide by reaction with oxygen during the shut down procedure. Therefore, in accordance with the present invention, when the fuel cell is operated on a reformed hydrocarbon, the "balance fuel cell inert gases" may include a larger amount of carbon dioxide than in the case of cells using pure hydrogen as the fuel; however, the objective of an equilibrium gas composition of at least 0.0001% hydrogen, balance fuel cell inert gases, is the same.

It was discovered, through a series of start-up/shut-down tests, that generating an equilibrium gas composition of at least a dilute concentration of hydrogen, balance fuel cell inert gases, within the anode and cathode flow fields upon shut-down, and then maintaining at least a dilute concentration of hydrogen, balance fuel cell inert gases, within the anode and cathode flow fields during shut-down, virtually eliminates performance losses that were observed when using other shut-down procedures. It was also observed that the shut-down procedure of the present invention was able to regenerate cell performance lost by a fuel cell system that had experienced a series of shut-downs and start-ups that maintained 100% air on both sides of the cell throughout the period of shut-down. Such regeneration was surprising, since it was believed the lost performance had been due solely to catalyst and catalyst support corrosion, which cannot be reversed. This performance recovery led to the conclusion that some other mechanism was causing performance loss, and the present invention was able to reverse most, if not substantially all of that loss. The improvement is most dramatic at high current densities.

It is theorized that the additional performance decay mechanism is the formation of carbon oxides on the surface of the carbon support material and the formation of platinum oxides on the surface of the catalyst. It is also theorized these oxides form if the electrodes are subjected to a high air potential during the shut-down process, including while the cell remains idle. The surface oxides increase the wetability of the carbon and platinum causing partial flooding and, therefore, loss of performance. Factors that may be at work in the procedure of the present invention to eliminate the performance decay are the maintenance of a low electrode potential (versus the standard hydrogen electrode) during shut-down and chemical and/or electrochemical reactions involving the presence of hydrogen.

In the procedure of the present invention, the equilibrium hydrogen concentration required to be maintained during shut-down is based upon several factors. One factor is that 0.0001% hydrogen is the minimum amount needed to reduce (and maintain) the electrode potentials to less than 0.2 volts above the potential of a standard hydrogen reference electrode. At less than 0.2 volts, platinum and platinum support corrosion and carbon and platinum oxidation are virtually eliminated. Actually, hydrogen concentration of at least 1% is preferred for two reasons: first, it will reduce the electrode potential to less than 0.1 volts, at which level virtually no corrosion and surface oxidation occurs; and, second, it is easier to measure, monitor, and control than much smaller concentrations, such as 0.1% or less.

The upper end of the range for hydrogen concentration is not critical to the prevention of cell performance loss. Having 100% hydrogen throughout the cells would work fine, but is difficult and costly. For that reason, a 10% hydrogen concentration (balance fuel cell inert gases) is a more practical upper limit. On the other hand, for safety, it is preferred to have and to maintain a hydrogen concentration of less than 4%, since more than 4% hydrogen in air is considered in excess of the flammability limit. If there were less than 4% hydrogen, then any air that leaks into or is otherwise introduced into the cell would not be hazardous. If the shut-down equilibrium hydrogen concentration is maintained below 4%, the present invention will have the added benefit of allowing rapid start-up of the fuel cell by simply turning on the fuel flow and the air flow, without the necessity of first purging the hydrogen from the cathode flow field with an inert gas, such as nitrogen. For an extra margin of safety, a hydrogen concentration during shut-down of no more than about 3% is preferred.

In one embodiment of the present invention, after disconnecting the primary load and shutting off the air supply to the cathode flow field, fresh fuel continues to be fed to the anode flow field until the remaining oxidant is completely consumed. This oxidant consumption is preferably aided by having a small auxiliary load applied across the cell, which also quickly drives down the electrode potentials. Once all the oxidant is consumed the fuel feed is stopped, the fuel exit valve is shut, and air is introduced into the anode flow field (if needed) until the hydrogen concentration in the anode flow field is reduced to a selected intermediate concentration level, above the desired final concentration level. Air flow into the anode flow field is then halted, and the fuel cell gases are allowed to come to equilibrium, which will occur through diffusion of gases across the electrolyte and chemical and electrochemical reaction between the hydrogen and the added oxygen. The intermediate hydrogen concentration level is selected based upon the relative volumes of the anode and cathode flow fields, such that the resulting hydrogen concentration at equilibrium (i.e. after all the oxygen has been consumed and the hydrogen and fuel cell inert gases are fully dispersed throughout the cell) will be within the desired range. Thereafter, during continued shut-down, the hydrogen concentration is monitored; and hydrogen is added, as and if necessary, to maintain the desired hydrogen concentration level. This latter step of adding hydrogen is likely to be required due to leakage or diffusion of air into the system and/or leakage or diffusion of hydrogen out of the system, such as through seals. As air leaks into the system, hydrogen reacts with the oxygen in the air and is consumed. That hydrogen needs to be replaced, from time to time, to maintain the hydrogen concentration within the desired range.

In another embodiment of the shut-down procedure of the present invention which uses either pure hydrogen as the fuel, or a reformate with a relatively high hydrogen concentration, the primary load is disconnected and both the hydrogen flow to the anode flow field and the fresh air flow into and through the cathode flow field are shut off. This essentially traps an initial amount of hydrogen within the anode flow field and an initial amount of air within the cathode flow field. In all practically sized fuel cell systems using pure hydrogen as the fuel the trapped amount of hydrogen will be considerably more than required to consume all the trapped amount of oxygen, leaving a hydrogen concentration above the desired final equilibrium concentration. That will also be the case for reformates with high hydrogen concentrations. (An auxiliary load may also be used in this embodiment to quickly drive down the electrode potentials and rapidly consume the oxygen.)

In either case, a restricted flow of oxygen (most preferably in the form of air), beyond the initial amount, is provided directly into the anode flow field to bring on a further reduction in the concentration of hydrogen, until the gases reach an equilibrium gas composition having a desired hydrogen concentration (balance fuel cell inert gases), or a hydrogen concentration within a pre-selected range, for example, between 1% and 3%, (balance fuel cell inert gases). When the equilibrium hydrogen concentration is as desired, no further air is fed to the anode flow field. As in the embodiment first described above, the hydrogen concentration within the anode flow field is monitored during shut-down. Additional hydrogen is added, as and if necessary, to replace any hydrogen lost through leakage or through reaction with any oxygen that may leak into the system. In that manner, the gas composition is maintained within the desired range until the fuel cell system is to be started again.

The foregoing features and advantages of the present invention will become more apparent in light of the following detailed description of exemplary embodiments thereof as illustrated in the accompanying drawings.

DETAILED DESCRIPTION OF THE INVENTION

Figure 1:
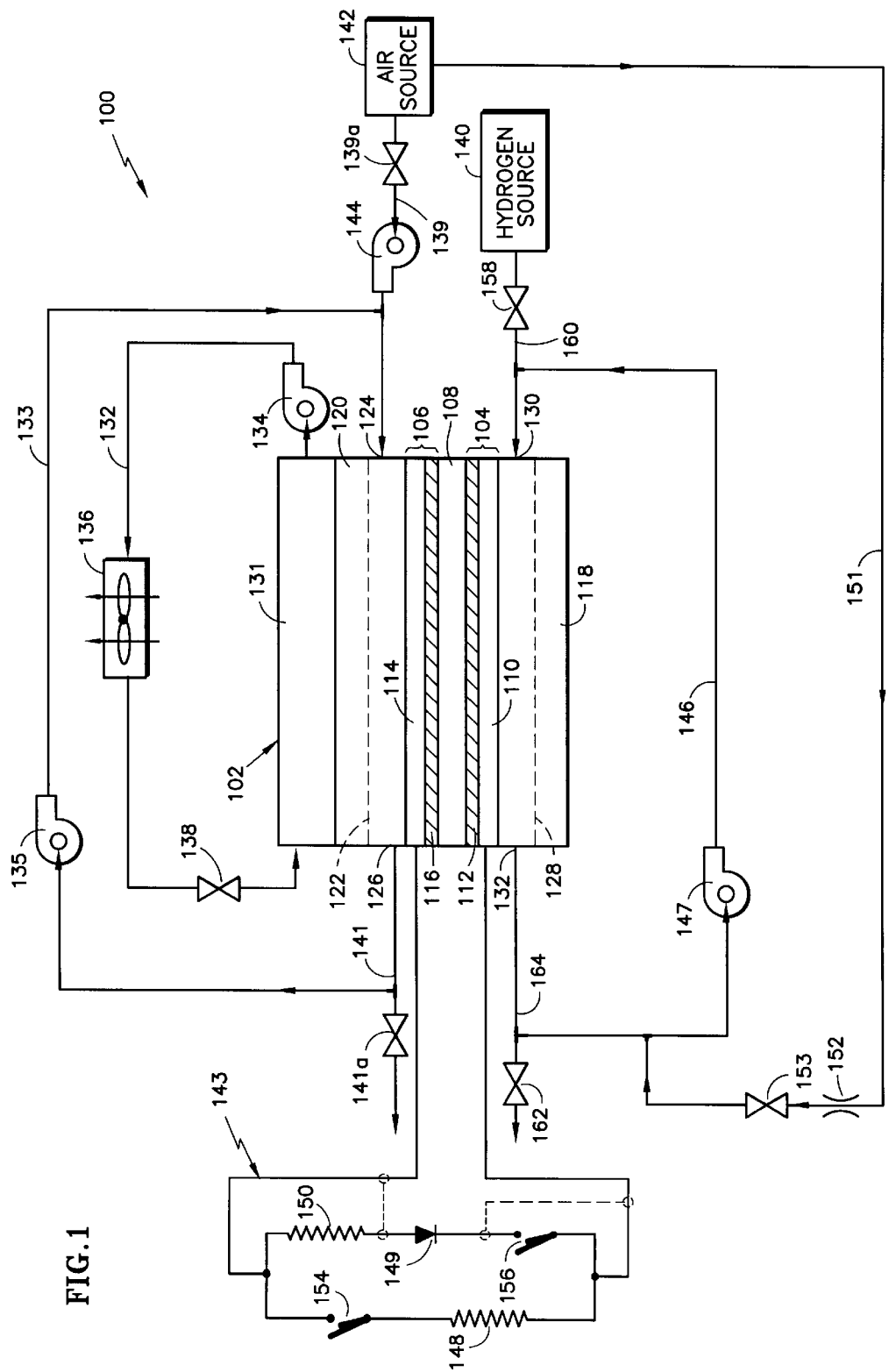
FIG. 1 is a schematic depiction of a fuel cell system that may be shut down in accordance with the procedures of the present invention.

In FIG. 1, a fuel cell system 100 is shown. The system includes a fuel cell 102 comprising an anode 104 (which may also be referred to herein as the anode electrode), a cathode 106 (which may also be referred to as the cathode electrode), and an electrolyte 108 disposed between the anode and cathode. The electrolyte may be in the form of a proton exchange membrane (PEM) of the type described in U.S. Pat. No. 6,024,848, or the electrolyte may be held within a ceramic matrix, such as is typically found in acid aqueous electrolyte fuel cells, such as phosphoric acid electrolyte fuel cells. The anode includes an anode substrate 110 having an anode catalyst layer 112 disposed thereon on the side of the substrate facing the electrolyte 108. The cathode includes a cathode substrate 114, having a cathode catalyst layer 116 disposed thereon on the side of the substrate facing the electrolyte 108. The cell also includes an anode flow field plate 118 adjacent the anode substrate 110 and a cathode flow field plate 120 adjacent the cathode substrate 114.

The cathode flow field plate 120 has a plurality of channels 122 extending thereacross adjacent the cathode substrate forming a cathode flow field for carrying an oxidant, preferably air, across the cathode from an inlet 124 to an outlet 126. The anode flow field plate 118 has a plurality of channels 128 extending thereacross adjacent the anode substrate forming an anode flow field for carrying a hydrogen containing fuel across the anode from an inlet 130 to an outlet 132. Each cell also includes a cooler 131 adjacent the cathode flow field plate 120 for removing heat from the cell, such as by using a water pump 134 to circulate water through a loop 132 that passes through the cooler 131, a radiator 136 for rejecting the heat, and a flow control valve or orifice 138.

Although only a single cell 120 is shown, in actuality a fuel cell system would comprise a plurality of adjacent cells (i.e. a stack of cells) connected electrically in series, each having a cooler or separator plate (not shown) separating the cathode flow field plate of one cell from an anode flow field plate of the adjacent cell. For more detailed information regarding fuel cells like the one represented in FIG. 1, the reader is directed to commonly owned U.S. Pat. Nos. 5,503,944 and 4,115,627, both of which are incorporated herein by reference. The '944 patent describes a solid polymer electrolyte fuel cell wherein the electrolyte is a proton exchange membrane (PEM). The '627 patent describes a phosphoric acid electrolyte fuel cell wherein the electrolyte is a liquid held within a porous silicon carbide matrix layer. The present invention is particularly well suited for use with PEM cells; but it may also be used with phosphoric acid cells.

Referring, again, to FIG. 1, the fuel cell system includes a source 140 of hydrogen containing fuel and a source 142 of air. The fuel may be pure hydrogen or other hydrogen rich fuel, such as reformed natural gas or gasoline. A conduit 139 carries air from the source 142 into the cathode flow field inlet 124; and a conduit 141 carries spent air away from the outlet 126. The conduits 139, 141 each include air inlet and exit valves 139a and 141a, respectively, disposed therein. An oxidant recycle loop 133, having an oxidant recycle blower 135 disposed therein, may be used to circulate spent air from the cathode flow field outlet 126 back into the cathode flow field inlet 124.

The fuel cell system also includes an external circuit 143 connecting the anode and cathode, an air blower 144 disposed within the conduit 139, a fuel recycle loop 146, and a fuel recycle loop blower 147 disposed within the fuel recycle loop. The external circuit 143 includes a primary load 148, and an auxiliary resistive load 150 in parallel with the primary load, and a diode 149 in series with the auxiliary resistive load. An air feed conduit 151 is provided for adding air from the air source 142 (or any other source of oxygen other than from the cathode flow field) into the fuel recycle loop at a point upstream of the recycle blower. A flow restrictor 152 and an air bleed valve 153 are disposed within the conduit 151.

During normal fuel cell operation, a primary load switch 154 is closed (it is shown open in the drawing), and an auxiliary load switch 156 is open, such that the fuel cell is providing electricity to the primary load. The air blower 144, the anode flow field exhaust recycle blower 147 and the coolant pump 134 are all on. The air flow valves 139a and 141a are open. The valve 153 is closed such that no air flows into the anode flow field via the recycle loop. A fuel feed valve 158 in a fuel feed conduit 160 to the anode flow field is open, as is an anode exhaust vent valve 162 in an anode exhaust conduit 164. The coolant loop flow control valve 138 is also open; and the coolant pump 134 is on.

Thus, during normal operation, air from the source 142 is continuously delivered into the cathode flow field inlet 124 via the conduit 139 and leaves the outlet 126 via the conduit 141. A hydrogen containing fuel from the source 140 is continuously delivered into the anode flow field via the conduit 160. A portion of the anode exhaust, containing depleted hydrogen fuel, leaves the anode flow field through the vent valve 162 via the conduit 164, while the recycle blower 147 recirculates the balance of the anode exhaust through the anode flow field via the recycle loop in a manner well know in the prior art. Recycling a portion of the anode exhaust helps maintain a relatively uniform gas composition from the inlet 130 to the outlet 132 of the anode flow field, and increases hydrogen utilization. As the hydrogen passes through the anode flow field, it electrochemically reacts on the anode catalyst layer in a well-known manner to produce protons (hydrogen ions) and electrons. The electrons flow from the anode 104 to the cathode 106 through the external circuit 143 to power the primary load 148.

To shut down the operating fuel cell system according to this embodiment of the present invention, the switch 154 in the external circuit 143 is opened to disconnect the primary load 148. The fuel flow valve 158 remains open; and the fuel recycle blower remains on to continue recirculation of a portion of the anode exhaust. However, the anode exhaust vent valve 162 will remain open or be closed depending upon the percent hydrogen in the incoming fuel and the relative volumes of the anode and cathode sides of the fuel cell, as is explained below. The flow of fresh air to the cathode flow field is turned off by closing the air inlet and air exit valves 139a and 141a. The primary air blower 144 is also shut off; however, the oxidant recycle blower 135 is preferably turned on to circulate air from the cathode flow field outlet 126 to the cathode flow field inlet 124. This creates a uniform gas composition within the cathode flow field and ultimately helps speed the fuel cell gases to equilibrium within the cell. The auxiliary load 150 is connected by closing the switch 156. With current flowing through the auxiliary load, typical electrochemical cell reactions occur, causing the oxygen concentration in the cathode flow field to be reduced and cell voltage to be lowered.

The application of the auxiliary load is preferably initiated while there is still sufficient hydrogen within the fuel cell to electrochemically react all the oxidant. It preferably remains connected at least until the cell voltage is lowered to a pre-selected value, preferably 0.2 volts per cell or less. The diode 149, connected across the cathode and anode, senses the cell voltage and allows current to pass through the load 148 as long as the cell voltage is above the pre-selected value. In that way, the cell voltage is reduced to and thereafter limited to the pre-selected value. When the cell voltage drops to 0.2 volts per cell, substantially all the oxygen within the cathode flow field, and any that has diffused across the cell, will have been consumed. The auxiliary load may now be disconnected by opening the switch 156; but it is preferred to leave it connected throughout the remainder of the shut down procedure to limit the cell voltage to no more than 0.2 volts per cell while the cell is shut down.

Whether the anode exhaust vent valve 162 needs to be open during the foregoing procedure is determined by the hydrogen concentration of the incoming fuel and the relative volumes of gas space on the anode and cathode sides of the cell. On the anode side, that includes the anode flow field and its associated plumbing/manifolding, such as the recycle loop conduit and fuel inlet and outlet manifolding. On the cathode side, it includes the cathode flow field and its associated plumbing/manifolding, such as the air recycle loop and the air inlet and outlet manifolding. The vent valve 162 may remain closed if there would be enough hydrogen trapped within the anode side gas space to consume all the oxygen remaining within the cathode side gas space. For example, assume the volume of the fuel side gas space is 0.35 ft$^3$ and the volume of the oxidant side gas space is 1.00 ft$^3$. Also, assume that, at the time of shutting the air inlet and outlet valves, 139a, 141a, the average oxygen concentration throughout cathode side gas space is 15%. In that case, there would be enough hydrogen on the anode side to consume all the oxygen on the cathode side if the fuel feed from the hydrogen source 140 has a hydrogen concentration of at least about 50%. If the fuel is a reformate having only a 30% hydrogen concentration, it will be necessary to leave the fuel vent valve 162 open at least for some portion of the time during which the oxygen is being consumed; or, optionally, it could be left open until all the oxygen is consumed. Whether and for how long the fuel needs to continue to flow as the oxygen is consumed is easily determined by persons having ordinary skill in the art.

Once all the oxygen within the anode and cathode flow fields is consumed, the fuel feed valve 158 and the anode exhaust vent valve 162, if open, are shut; however, the fuel recycle blower 147 remains on. The oxidant recycle blower 135 is turned off. The air bleed valve 153 is opened, resulting in additional oxygen entering directly into the anode flow field via the recycle loop 146. The hydrogen within the anode flow field rapidly reacts with and consumes the oxygen, and somewhat more slowly diffuses across the electrolyte. The valve 153 is controlled to only allow an amount of oxygen into the anode flow field sufficient to result in a hydrogen concentration at the desired level when the gases have reached equilibrium. This may be accomplished by using appropriately located sensors (not shown) to measure hydrogen concentration. For example, the hydrogen concentration may be reduced in two stages by monitoring the hydrogen concentration within the anode flow field. During the first stage the concentration is lowered to a predetermined first level (hereinafter, level "A"); and during stage two the hydrogen concentration is lowered to the desired final level (hereinafter, level "B"). Knowing the relative volumes of the gas spaces on both sides of the cell, no further air is provided to the anode when the concentration of hydrogen within the anode flow field reaches level A. The numerical value of A is selected such that, when the air flow to the anode flow field is halted, the last of the oxygen is consumed, and the hydrogen thereafter diffuses throughout the cell, the final equilibrium hydrogen concentration level will be B, balance fuel cell inert gases.

For example, assume the anode flow field and its associated plumbing/manifolding has a volume of 1.0 unit and the cathode flow field and associated plumbing has a volume of 3.0 units, for a total volume of 4.0 units. Also, assume that, precisely at the end of stage one, substantially all the remaining hydrogen within the fuel cell is within the anode flow field and its associated plumbing. A certain amount of that hydrogen will redistribute itself during stage two. At the end of stage two, all remaining hydrogen will be spread throughout four units of volume rather than one. Finally, assume the desired final equilibrium hydrogen gas concentration is to be between 1.0% and 3.0%. With these assumptions, if the hydrogen concentration in the anode flow field at the end of stage one is 6%, the resulting final equilibrium hydrogen concentration would be about 1.5%. And, if the hydrogen concentration at the end of stage one were 13.5%, the resulting final equilibrium hydrogen concentration would be about 3.4%. Therefore, in this example, if, at the end of stage one the hydrogen concentration in the anode flow field is between 6% and 13.5% (i.e., level A is between 6% and 13.5%), the hydrogen concentration at the end of stage two (level B) will necessarily be between about 1.5% and 3.4%. It is clear from the foregoing that a person having ordinary skill in the art can readily calculate the correct numbers for A and B for the particular fuel cell system to which this shut-down procedure is to be applied. Alternatively, A and B can readily be determined empirically.

In another embodiment, after the air flow to the cathode flow field has been stopped, the valve 153 may be opened intermittently, and the gases are allowed to come to equilibrium after each injection of air. The equilibrium hydrogen concentration is measured using sensors; and additional injections of air continue until the sensed hydrogen concentration is the desired final hydrogen concentration, such as between 0.0001% and 10%, preferably between 1.0% and 4.0%, and most preferably between 1.0% and 3.0% (with the balance being fuel cell inert gases). The recycle blower 147 and the coolant pump 134 may now be shut-off. However, as stated above, it is preferred to keep the auxiliary load switch 156 closed.

The fuel cell system is now considered to be shut down, which is hereinafter sometimes referred to as in "storage" until the primary load is reconnected and the system is restarted. During storage, air may leak slowly into the anode and cathode flow fields through seals; or hydrogen may leak out of the system. As that happens, the gas composition within the fuel cell will change. To counterbalance this leakage and maintain the equilibrium gas composition within the desired range during storage, the hydrogen concentration within the anode flow field is monitored. Preferably this is done by turning on the fuel recycle blower from time to time, and taking a reading with a hydrogen sensor within the anode flow field or recycle loop as the gases circulate. Hydrogen or a hydrogen rich fuel is then added to the anode flow field (such as through the valve 158), as needed, to maintain the gas composition within the desired range throughout the storage period (i.e. while the system is shut down).

When it is time to restart the fuel cell system, the auxiliary load, if still connected, is disconnected by opening the switch 156. The coolant pump 134 is turned on. The valves 158, 162, 139a, and 141a are opened, and the blowers 144 and 147 are turned on, thereby flushing the anode flow field with hydrogen and the cathode flow field with air. The primary load 148 is then connected within the external circuit 143 by closing the switch 154.

Although the shut-down procedure described above in connection with FIG. 1 uses an auxiliary load 150 to initially drive down the electrode potentials upon shut-down, the use of an auxiliary load is optional. Without the auxiliary load the electrode potentials will still be driven down to the levels necessary to minimize cell performance degradation as the hydrogen consumes any oxygen remaining within the flow fields. The benefit of using an auxiliary load is the increased speed at which the electrode potentials are lowered. The electrode potentials are maintained low by monitoring the hydrogen concentration and adding hydrogen in sufficient quantities to consume any oxygen that leaks into the flow fields.

Although the fuel cell system 100 of FIG. 1 includes a separate conduit 151 for delivering required additional air into the anode flow field during the shut-down procedure, other means could be used as well. For example, ambient air could be drawn into the recycle loop 146 through the fuel vent valve 162.

In the fuel cell system of FIG. 1 valves 139a and 141a in the air inlet and outlet conduits 139, 141, respectively, are used to prevent air from entering or leaving the cathode flow field after the primary load is disconnected. In some fuel cell systems, the diffusion path in the conduits upstream of the air blower 144 and downstream of the valve 141a may be so long that valves 139a and 141a may be unnecessary. That is, upon shut-down, once the blower 144 is turned off, if the diffusion paths are long enough, virtually no additional air will diffuse into the cathode flow field, even though the valves 139a and 141a remain open. Similarly, on the fuel side, if the diffusion path downstream of the vent valve 162 is long enough, virtually no air will diffuse into the anode flow field even with the vent valve 162 open. For that reason, it may even be possible to remove the valves 139a and 141a from the system.

An experiment demonstrating some of the benefits of the shut-down procedures of the present invention was conducted using a stack of PEM fuel cells of the general type described in commonly owned U.S. Pat. No. 5,503,944. These tests were performed with a cell configuration that consisted of a 15 micron thick electrolyte layer. The electrolyte layer was a perfluorosulfonic acid ionomer reinforced with polytetrafluoroethylene. The anode catalyst consisted of platinum and ruthenium supported on carbon and the cathode catalyst was platinum on carbon. The electrolyte with both catalysts applied to it was purchased from the W. L. Gore and Associates of Elkton, Maryland under their designation "Primea 5561". The tests were performed with hydrogen as the fuel and air as the oxidant at one atmosphere absolute pressure and at 50° C. The cells were put through a first series of start-up and shut-down cycles (cycle A), each cycle including a brief time on primary load, and a brief time in "storage". Cycle A, which did not include the shut-down procedures of the present invention, was as follows: The stack was operated "on load" for about 65 seconds before shut-down procedures began. Upon disconnecting the primary load, the air flow to the cathode was shut off and an auxiliary load was connected while fresh hydrogen and fuel recycle gas continued to flow through the anode flow field for about 5 seconds to reduce the electrode potential. The fresh hydrogen fuel flow was then stopped, but for just under 6 minutes fuel recycle flow was continued while air was bled into the fuel recycle stream. During this time, all the hydrogen within the cells was consumed. At this point the anode flow field contained only nitrogen and oxygen; and air was fed into the cathode flow field to assure only air was present in the cathode flow field. The auxiliary load was then disconnected and the fuel recycle blower stopped. Air was then bled into the anode recycle stream such that the system had 100% air in both the anode and cathode flow fields. After a short period of down time (i.e. storage), the system was restarted by reconnecting the auxiliary load and purging the anode flow field with nitrogen. The auxiliary load was disconnected and hydrogen flow to the anode flow field and air flow to the cathode flow field commenced. The primary load was then connected and the cell operated for a brief period of time over a load range up to 400 mA/cm². The cycle was then repeated 576 times. Each cycle took 501 seconds.

The same stack of cells was then subjected to a second series of shut-down/start-up cycles (cycle B), wherein the shut-down procedures were in accordance with the teachings of the present invention. Cycle B was as follows: The primary load was disconnected and the air blower to the cathode flow field was turned off such that no fresh air entered the cathode flow field. (Note that the system did not include a cathode exhaust valve. The test apparatus included approximately four feet of 1.5 inch diameter cathode exhaust piping that created a long diffusion path which prevented back diffusion.) The auxiliary load was connected across the stack and hydrogen continued to be pumped through the anode flow field for about 5 seconds while the fuel recycle blower remained on. The hydrogen flow was then stopped. During this time the oxygen from the cathode flow field was quickly consumed by the hydrogen, and the gas composition in both the cathode and anode flow fields, which was now hydrogen with a balance of essentially nitrogen, quickly cam to equilibrium. After about 5 seconds of down time or "storage", the system was restarted by opening a fuel inlet valve to start a flow of hydrogen through the anode flow field. After about another 5 seconds the auxiliary load (which remained connected throughout the storage period) was disconnected and air flow to the cathode flow field was commenced. About 3 seconds thereafter, the primary load was connected and the cell operated for a brief period of time (about 10 seconds) over a load range up to 700 mA/cm². A complete cycle B took 88 seconds. It was repeated 2315 times. Due to the very brief storage period of each cycle, there was no need to monitor and adjust the hydrogen concentration as it always remained well above 0.0001%.

Figure 2:
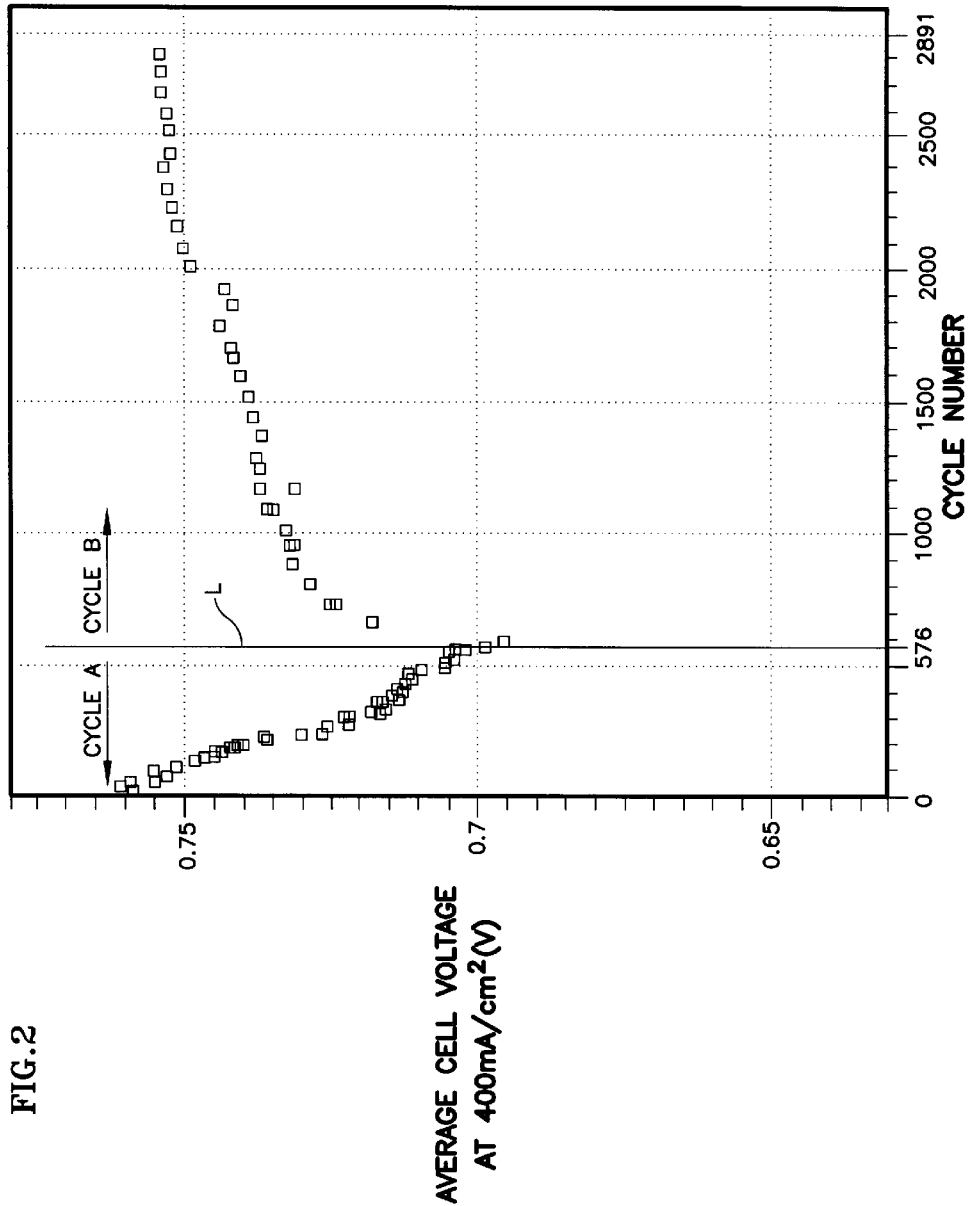
FIGS. 2 and 3 are graphs displaying performance data from a fuel cell stack subjected to two different series of multiple start-up/shut-down/storage cycles, one series of cycles including the shut-down and storage procedure of the present invention.
Figure 3:
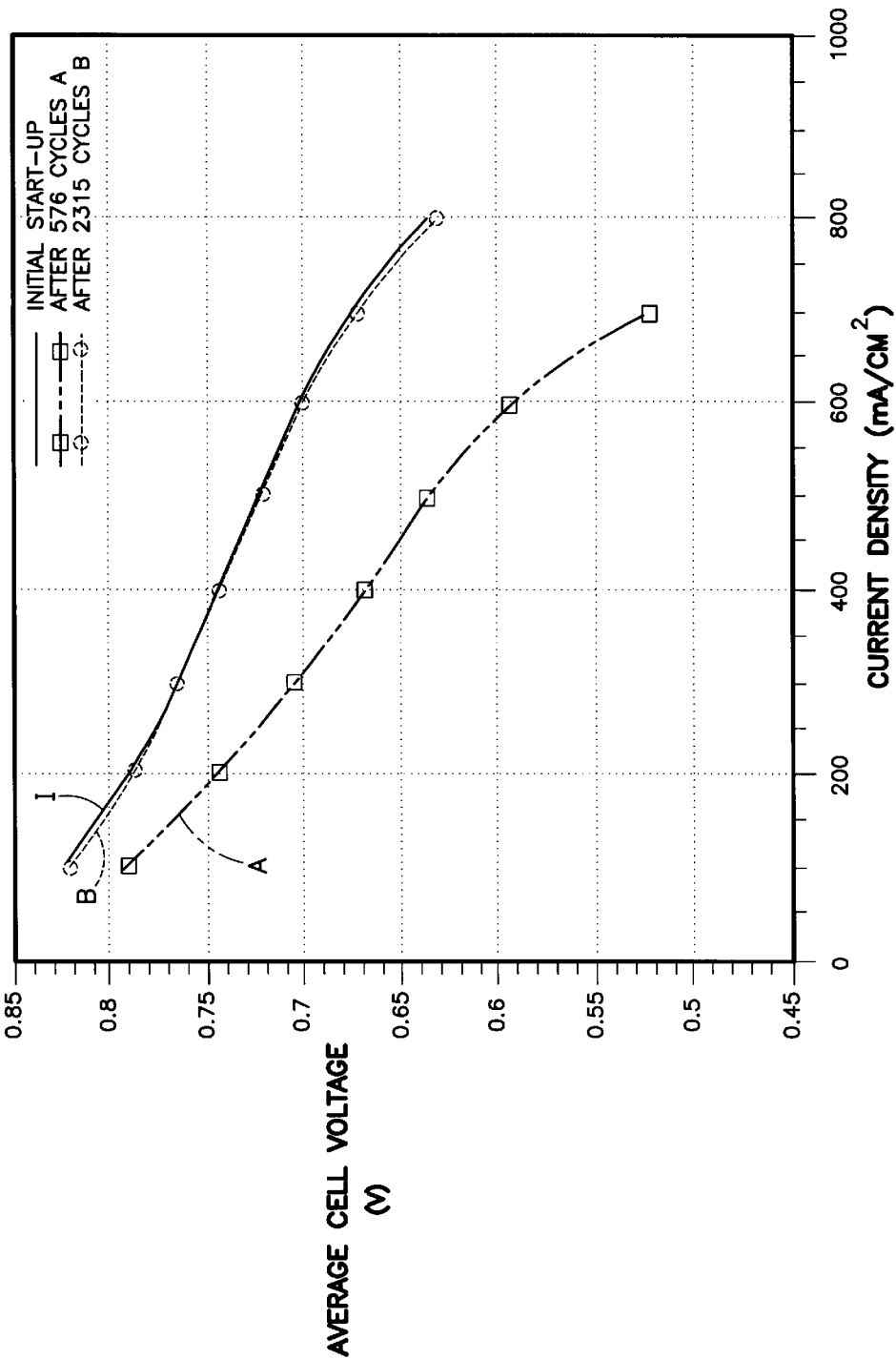

Results from the foregoing experiment are displayed in various forms in FIGS. 2 and 3. In FIG. 2, the average cell voltage measured at 400 mA/cm² during the course of cycles A and B is displayed. The stack was first subjected to 576 start-ups and shut-downs using cycle A. The stack was then subjected to 2315 start-ups and shut-downs using cycle B. The vertical line L marks the changeover from cycle A to cycle B. Over the course of those first 576 shut-downs/start-ups the average cell voltage fell sharply from about 0.760 volt to about 0.695 volt. Over the course of 2315 shut-downs/start-ups using cycle B, the voltage recovered to a value of about 0.755 volt.

In FIG. 3, curve I is the average cell voltage versus current density for the stack of cells prior to any shut-down/start-up cycles (i.e. curve I is the baseline cell performance); curve A is the average cell voltage after the 576 cycles A; and curve B is the average cell voltage after the additional 2315 cycles B. Note that the cell voltage, after the 576 cycles A, has dropped considerably from the baseline cell voltage; but, after the 2315 cycles B, virtually all the cell voltage loss has been recovered over the entire range of current density.

"In the foregoing experiment, the short "storage" period of cycle B did not allow time for all the hydrogen to leave the cells before restart. Since it was known that, during cycle A, the electrodes were exposed to air potential during storage, it was concluded that the presence of hydrogen prevented a performance decay that was attributable to exposing the electrodes to air potential during the shut-down procedure. The following additional experiment supports the conclusions drawn from the preceding experiment: 323 cycles A (as described above) were performed on one stack of cells, and 300 cycles of what is herein referred to as cycle C were performed on an identical stack of cells. Cycle C use the same shut-down and start-up procedure as cycle B, except the shut-down period was extended from about 5 seconds to 408 seconds and during the 408 second shut-down period the hydrogen continued to flow to the anode flow field. This gave cycle C a total cycle time of 501 seconds, he same as cycle A.

Figure 4:
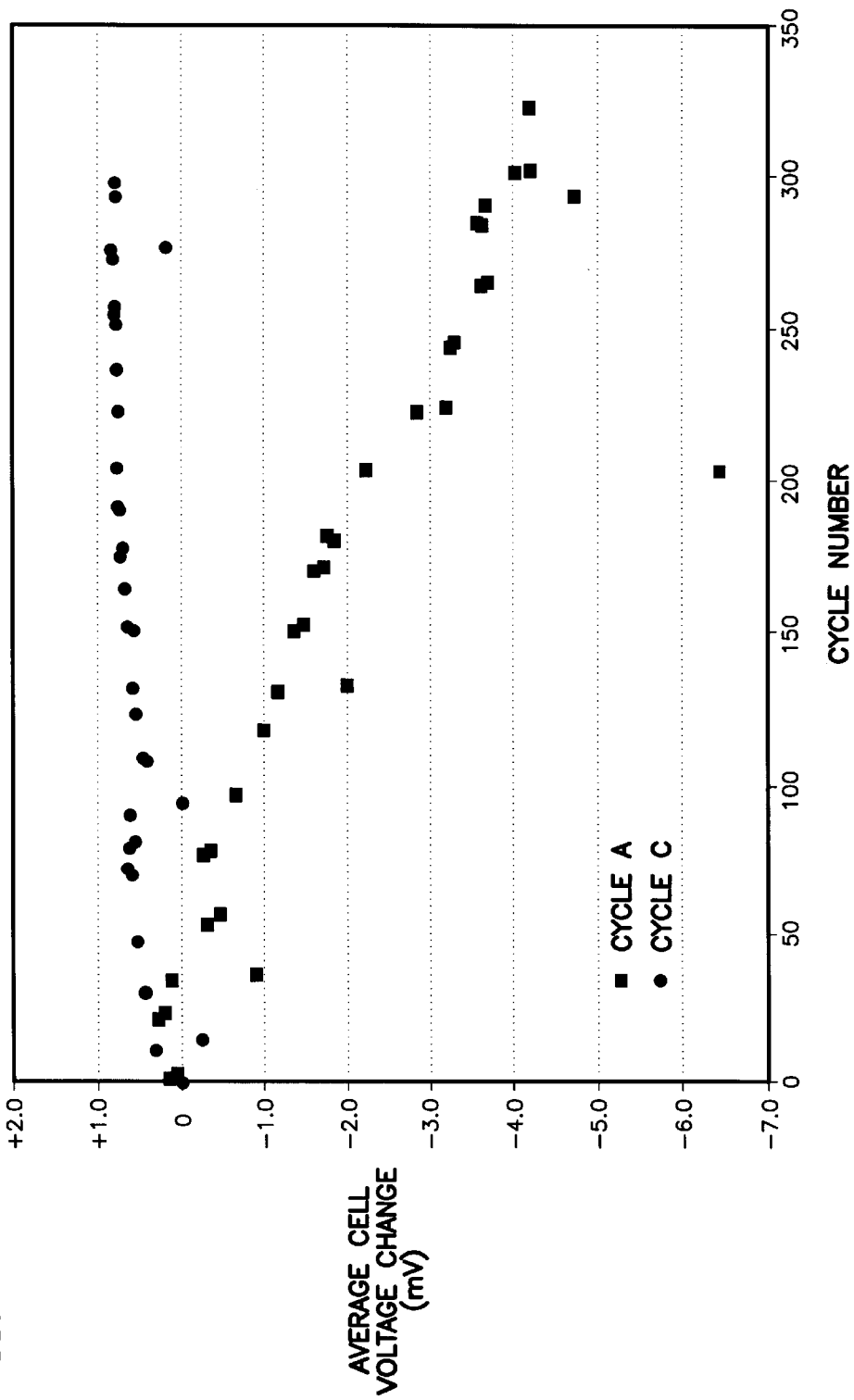
FIG. 4 is a graph displaying performance data from two identical fuel cell stacks, both having been subjected to several hundred start-up/shut-down/storage cycles, one of the cycles including a shut-down and storage procedure of the present invention.

Results from this latter experiment are displayed in the graph of FIG. 4. Number of cycles is plotted on the horizontal axis and average cell voltage change (from initial cell voltage) is plotted on the vertical axis. Cycle A resulted in the average cell voltage dropping about 45 mv after 300 cycles, while 300 cycles C resulted in an actual increase in average cell voltage of about 9 mv.

Although the invention has been described and illustrated with respect to the exemplary embodiments thereof, it should be understood by those skilled in the art that the foregoing and various other changes, omissions and additions may be made without departing from the spirit and scope of the invention.

What is claimed is:

1. A procedure for shutting down an operating fuel cell system, the system including at least one fuel cell, wherein during normal operation of the fuel cell system a continuous flow of air is fed into and through a cathode flow field in contact with a cathode electrode disposed on one side of an electrolyte within each fuel cell, and a continuous flow of fresh hydrogen containing fuel is fed into and through an anode flow field in contact with an anode electrode disposed on the other side of the electrolyte, and a electric current is generated by the fuel cell within a external circuit, wherein the current is operating a primary load connected to the external circuit, the shut-down procedure comprising:

disconnecting the primary load from the external circuit;

shutting off the fresh air flow to the cathode flow field;

after shutting off the fresh air flow, reducing the concentration of oxygen remaining within the cathode flow field and increasing the concentration of hydrogen within the fuel cells by reacting hydrogen with oxygen within the fuel cells until no oxygen remains within the anode and cathode flow fields and the gas composition within the anode and cathode flow fields come to an equilibrium gas composition of at least 0.0001% hydrogen, balance fuel cell inert gases; and, upon reaching said equilibrium gas composition, maintaining a gas composition of at least 0.0001% hydrogen, balance fuel cell inert gases, all the while the system is shut-down.

2. The shut-down procedure according to claim 1, wherein the fuel cell inert gases of the equilibrium gas composition include nitrogen, and all the nitrogen in the equilibrium gas composition is from air introduced into the fuel cell system, including from air, if any, mixed into the hydrogen containing fuel prior to feeding the fuel into the anode flow field.

3. The shut-down procedure according to claim 1, wherein said equilibrium gas composition has a hydrogen concentration within the range of 0.0001% and 10.0%, balance fuel cell inert gases, and said step of maintaining a gas composition of at least 0.0001% hydrogen includes maintaining a gas composition having a hydrogen concentration of between 0.0001% and 10.0%, balance fuel cell inert gases, all the while the system is shut-down.

4. The shut-down procedure according to claim 3, wherein the step of reducing the oxygen concentration includes shutting off the fuel flow into the anode flow field, wherein after said step of disconnecting the primary load and after said step of shutting off the air flow, but before said step of shutting off the fuel flow into the anode, connecting an auxiliary load across the cells, and maintaining that load until the cell voltage is lowered to 0.2 volts per cell or less.

5. The shut-down procedure according to claim 4, wherein the auxiliary load remains connected all the while the system is shut-down.

6. The shut-down procedure according to claim 3, wherein said step of reducing the concentration of oxygen within the cathode flow field includes recycling the cathode flow field gas through a recycle loop until no oxygen remains within either the anode or cathode flow fields.

7. The shut-down procedure according to claim 6, wherein said step of reducing the concentration of oxygen includes connecting an auxiliary load across the cells, and maintaining that load until the cell voltage is lowered to 0.2 volts per cell or less.

8. The shut-down procedure according to claim 6, wherein during the step of reducing the concentration of hydrogen but after stopping the flow of air into the cathode flow field, the step of adding oxygen into the anode flow field in amounts as required to reduce the hydrogen concentration within the fuel cells to an equilibrium concentration of between 0.0001% and 10%, balance fuel cell inert gases.

9. The shut-down procedure according to claim 8, wherein said step of adding oxygen comprises adding oxygen in amounts as required to reduce the hydrogen concentration within the fuel cells to an equilibrium concentration of between 1.0% and less than 4%.

10. The shut-down procedure according to claim 3, wherein the electrolyte is in the form of a proton exchange membrane.

11. The shut-down procedure according to claim 10, wherein at the end of the period of shut-down when the fuel cell is to be restarted, the anode flow field is flushed with hydrogen containing fuel and the cathode flow field is flushed with air, and the primary load is then reconnected across the cell.

12. The shut-down procedure according to claim 3, wherein the electrolyte is in the form of an acid aqueous electrolyte.

13. The shut-down procedure according to claim 1, wherein said equilibrium gas composition has a hydrogen concentration within the range of 0.0001% and less than 4.0%, balance fuel cell inert gases, and said step of maintaining a gas composition of at least 0.0001% hydrogen includes maintaining a gas composition having a hydrogen concentration of between 0.0001% and less than 4.0% hydrogen, balance fuel cell inert gases, all the while the system is shut-down.

14. The shut-down procedure according to claim 13, wherein the hydrogen gas composition within the fuel cells is determined at least periodically during shut-down, and hydrogen is added, as necessary, to maintain a gas composition having a hydrogen concentration of at least 0.0001% and less than 4.0%, balance fuel cell inert gases, all the while the system is shut-down.

15. The shut-down procedure according to claim 1, wherein said equilibrium gas composition has a hydrogen concentration within the range of 1.0% and less than 4.0%, and said step of maintaining a gas composition of at least 0.0001% hydrogen includes maintaining a gas composition having a hydrogen concentration of between 1.0% and less than 4.0% hydrogen, balance fuel cell inert gases, all the while the system is shut-down.

16. The shut-down procedure according to claim 1, wherein said step of maintaining a gas composition with a hydrogen concentration of at least 0.0001% all the while the system is shut-down includes determining the hydrogen concentration within the fuel cells at least periodically throughout said shut-down period, and adding hydrogen to the anode flow field as necessary to maintain the hydrogen concentration at a desired level of at least 0.0001%.

17. A procedure for shutting down an operating fuel cell system, wherein during operation of the fuel cell system a continuous flow of air is fed into a cathode flow field into contact with a cathode electrode disposed on one side of an electrolyte, and a continuous flow of hydrogen containing fuel is fed into an anode flow field into contact with an anode electrode disposed on the other side of the electrolyte, and an electric current is being generated by the fuel cell within an external circuit, wherein the current is operating a primary load connected to the external circuit, the shut-down procedure comprising:

disconnecting the primary load from the external circuit;

shutting off the air flow into the cathode flow field and then reducing the concentration of oxygen remaining within the cathode flow field and increasing the concentration of hydrogen within the fuel cells by a) controlling the amount of hydrogen entering the fuel cell system, b) adding air directly into the anode flow field, as necessary, and c) controlling the flow rate of the gases leaving the fuel cell system, such that the gases within the anode flow field and cathode flow field come to equilibrium with a gas composition of between 0.0001% and less than 4.0% hydrogen, balance fuel cell inert gases, including nitrogen, wherein all the nitrogen in the equilibrium gas composition is from air introduced into the fuel cell system, including from air, if any, mixed into the fuel prior to feeding the fuel into the anode flow field; and, once the gas composition has reached a gas composition with a selected hydrogen concentration within said range, balance fuel cell inert gases, maintaining an equilibrium gas composition having a hydrogen concentration within said range, balance fuel cell inert gases, during the entire time the primary load is disconnected by adding hydrogen, as needed.

18. The shut-down procedure according to claim 17, wherein said step of reducing the concentration of oxygen includes connecting an auxiliary load across the cells, and maintaining that load until the cell voltage is lowered to 0.2 volts per cell or less.

19. A procedure or shutting down an operating fuel cell system, the system including at least one fuel cell, wherein during normal operation of the fuel cell system a continuous flow of air is fed into and through a cathode flow field in contact with a cathode electrode disposed on one side of a electrolyte within each fuel cell, and a continuous flow of fresh hydrogen containing fuel is fed into and through an anode flow field in contact with an anode electrode disposed on the other side of the electrolyte, and an electric current is generated by the fuel cell within an external circuit, wherein the current is operating a primary load connected to the external circuit, the shut-down procedure comprising:

disconnecting the primary load from the external circuit and shutting off the fresh air flow to the cathode flow field; and, thereafter, shutting off the fresh fuel flow to the anode flow field and reacting hydrogen containing fuel with oxygen within the cell until all the oxygen within the fuel cell is consumed and the gas composition within the anode and cathode flow fields come to equilibrium with a hydrogen gas concentration of at least 0.0001% hydrogen, balance fuel cell inert gases.

20. The shut-down procedure according to claim 19, wherein after disconnecting the primary load and shutting off the fresh air flow to the cathode flow field, the step of connecting an auxiliary load across the cells and maintaining that load until the cell voltage is lowered to 0.2 volts per cell or less.

21. The shut-down procedure according to claim 20, wherein the auxiliary load is maintained across the cells throughout the period of shut-down.

22. The shut-down procedure according to claim 20, wherein the electrolyte is a proton exchange membrane.

23. The shut-down procedure according to claim 22, wherein the auxiliary load is maintained across the cells throughout the period of shut-down.

24. The shut-down procedure according to claim 22, wherein at the end of the period of shut-down the anode flow field is flushed with hydrogen and the cathode flow field is flushed with air, and the primary load is reconnected across the cell.

25. The shut-down procedure according to claim 22, including maintaining a hydrogen concentration of 0.0001% hydrogen, balance fuel cell inert gases, all the while the system is shut down.

26. The shut-down procedure according to claim 19, wherein after said step of disconnecting the primary load and shutting off the air flow, but before said step of shutting off the fresh fuel flow into the anode flow field, connecting an auxiliary load across the cells, and maintaining that load until the cell voltage is lowered to 0.2 volts per cell or less.

27. The shut-down procedure according to claim 26, wherein the auxiliary load is maintained across the cells throughout the period of shut-down.

28. The shut-down procedure according to claim 19, wherein said step of reacting hydrogen containing fuel with oxygen includes recirculating a portion of the anode flow field exhaust through a recycle loop while venting the anode flow field exhaust.

29. The shut-down procedure according to claim 28 wherein said step of recirculating includes bleeding a controlled amount of air into the recycle loop.

30. The shut-down procedure according to claim 29, wherein the amount of air bled into the recycle loop is controlled to reduce the hydrogen concentration within the fuel cells to an equilibrium concentration of between 0.0001% and 10%, balance fuel cell inert gases.

* * * * *